United States Patent [19]

Hanulik

[11] Patent Number: 5,120,409
[45] Date of Patent: Jun. 9, 1992

[54] PROCESS FOR RECYCLING AN UNSORTED MIXTURE OF SPENT BUTTON CELLS AND/OR OTHER METALLIC OBJECTS AND FOR RECOVERING THEIR METALLIC COMPONENTS

[75] Inventor: Jozef Hanulik, Zurich, Switzerland
[73] Assignee: Recytec S.A., Neuchatel, Switzerland
[21] Appl. No.: 560,145
[22] Filed: Jul. 31, 1990
[30] Foreign Application Priority Data
  Aug. 8, 1989 [CH] Switzerland ............ 2918/89
[51] Int. Cl.⁵ .............................. C25C 1/00
[52] U.S. Cl. ................. 204/105 R; 204/109; 204/112; 204/114; 204/115
[58] Field of Search ............ 204/105 R, 109, 112, 204/114, 115

[56] References Cited
U.S. PATENT DOCUMENTS

| 3,985,630 | 10/1976 | Ginatta | 204/114 |
| 4,039,403 | 8/1977 | Astley et al. | 204/112 |
| 4,098,658 | 7/1978 | Ginatta | 204/114 |
| 4,229,271 | 10/1980 | Prengaman et al. | 204/114 |
| 4,769,116 | 9/1988 | Olper et al. | 204/114 |
| 4,927,510 | 5/1990 | Olper et al. | 204/115 |
| 4,992,149 | 2/1991 | Nguyen | 204/114 |

Primary Examiner—John Niebling
Assistant Examiner—David G. Ryser
Attorney, Agent, or Firm—Kane, Dalsimer, Sullivan, Kurucz, Levy, Eisele and Richard

[57] ABSTRACT

Process for recycling an unsorted mixture of spent button cells and recovering their metallic components, comprising an anodic dissolution of the button cells, wherein metals constituting these cells are dissolved and redeposited at one or more cathodes, wherein metallic oxides are deposited in the anodic chamber and waste products (plastic, paper, etc.) accumulate in an anodic basket. Oxides are reduced to metals by thermal decomposition, mercury is recovered by distillation and the other metals are recovered by electrolytic separation.

19 Claims, 2 Drawing Sheets

PROCESS FOR RECYCLING AN UNSORTED MIXTURE OF SPENT BUTTON CELLS AND/OR OTHER METALLIC OBJECTS AND FOR RECOVERING THEIR METALLIC COMPONENTS

DESCRIPTION

1. Field of the Invention

The present invention relates to a process for recycling an unsorted mixture of button cells and/or other metallic objects and for recovering their metallic components.

2. Prior Art

The world-wide consumption of electric button cells is steadily increasing and currently amounts to about 5 billion pieces per year, which represents about 10 thousand tons per year. Button cells (see FIG. 1) consist of a cup-shaped case (2) (positive pole) closed with a lid (1) (negative pole). Both case and lid are generally made of nickel-plated deep-drawn steel. The thickness of the nickel plating is about 5 micrometers. The positive (5) and negative (3) electrodes consist of pressed pastilles which are enclosed in a fine wire-mesh grid. Between the electrodes there is a microporous separator (4) made of non woven plastic fiber (or paper). The cells are sealed by a plastic gasket round the lid. This plastic sealing ring acts as an insulator between case and lid. Button cells have a generally cylindrical shape and a diameter which is greater than the height. The diameters are generally between 7 and 50 mm and the height between 5 and 10 mm. Departing from the usual circular shape there exists also cells are also made with an oval outline which belong to this group. The most important chemical couples working in these button cells are :

The Zn/HgO Couple average composition of the cell

| | |
|---|---|
| Hg | 30-40% |
| Zn | about 10% |
| electrolyte | 5-10% |
| diaphragm, paper | 1-5% |
| steel | remainder |

The Zn/Ag$_2$O couple average composition of the cell :

| | |
|---|---|
| Ag | 20-40% |
| Zn | about 10% |
| electrolyte | 5-10% |
| diaphragm | 1-5% |
| steel | remainder |

The Zn/O$_2$ couple, which contains mainly Zn and where the cathode is made of porous graphite.

The Zn/MnO$_2$ couple, although very important in larger round cells, is used to a lesser extent in button cells.

The Cd/NiOOH couple, used in rechargeable cells, contributes to a lesser extent to the waste from mass production because these cells can be recharged more than 500 times.

There is currently a very small number of the recently-introduced lithium button cells on the market.

Many processes have been developed in the past to recover the components of accumulators and batteries. In processes for recycling lead accumulators, the acid is generally taken out and then the shells are cut or otherwise mechanically disrupted. Then the inner plates are chemically treated (especially to recover lead).

In processes for recycling Ni/Cd accumulators, the accumulators are first mechanically crushed and the electrolyte is washed off. Then the oxides of Ni and Cd are reduced to metals in an oven in a reducing atmosphere where the Cd is distilled off at about 900° C. (boiling point of Cd=765° C.). The mixture of iron and nickel is not separated further but sold to steelworks. (See, for example, EP-A-075,978).

For the recovery of zinc and manganese from Zn/MnO$_2$ batteries, it has, for example, been proposed (EP-A-158,627) to pyrolysis the spent batteries, to wash and dry the pyrolysis slag, to reduce it at high temperature and to recover the zinc, which distils off, and the mixture of iron and manganese (ferro-manganese).

For recycling unsorted primary batteries, BOHAC (Elektricitat Anwendung in der Praxis, No 1, March 1988) proposes a process comprising the following steps :

two mechanical crushing steps;
mechanical separation step to separate the heavy components from the light components;
a magnetic separation of iron;
recovery of heavy metals as a mixture of hydroxides;
the fine fraction (40 to 45%), comprising mainly manganese oxides, coal and zinc powder and also mercury, is heated under reducing conditions, mercury distilling off at 800° C. and zinc at about 1,100° C.

In his application EP-A-274 059, the Applicant discloses a process for the recycling of electrical batteries of any composition and shape, starting with a pyrolysis of the unsorted mixture of batteries, which precedes the electrolytic separation of the components. The pyrolysis step is necessary to destroy the organic material present inside and outside the battery envelopes, but has to be carried out very carefully to avoid the formation of explosive gas mixtures.

Since the legal provisions of several developed countries now forbid direct dumping of button cells containing mercury in the environment, button cells are collected, often in the shops which sell devices using these cells as energy source. Attempts have been made to separate the different button-cell types according to their chemical composition, but this still remains a laborious and costly operation. Thus, although separated from larger cells, mixtures of button cells of all chemical types accumulate to form a particularly dangerous waste which cannot be discarded as domestic or ordinary industrial waste.

To recover metals from mixed button cells, EP-A-069,117 proposes the following steps :

cooling the mixture of cells to −150° C. and it up to 600° C. (thermal crushing and Hg distillation);
dissolving the opened cells with HNO$_3$;
precipitating the silver in form of AgCl;
recovering the gold, in form of amalgam, by adding mercury;
recovering a mixture of Fe, Cr, Al, Mn in form of hydroxides;
recovering Cd and Ni by electrolysis (electrolyte comprising a mixture of Cl− and NO$_3$− ions).

OBJECT OF THE INVENTION

The aim of the present invention is to recycle spent electric button cells and other metallic objects in order to avoid dangereous chemical products, especially mercury, entering the environment.

The aim of the present invention is also to recover the metallic compounds contained in electric button cells and other objects in order to reuse said metals in metallurgy and in battery manufacture.

This aim is achieved by means of a process which is characterized in that the chemical components of these cells and/or other objects are separated at least partially by an anodic dissolution of said cells and/or other objects, said cells and/or other objects themselves constituting the anode.

Other features of the present invention are detailed in the dependent claims.

Unlike other processes for recycling spent electric accumulators and batteries, and especially unlike processes aimed at recycling button cells, the process according to the present invention does not make use of a mechanical or thermal crushing step, but dissolves said button cells in an appropriate acid. It has been recognized by the Applicant that, despite the differences in shape, size and chemical composition of the button cells, all these cells have a common feature : their outer envelope is essentially made of metal, may be dissolved in an appropriate acid, and may also conduct electric current, and this fact can be used beneficially in an industrial process. According to another aspect of the present invention, said dissolution is not a simple chemical dissolution in an appropriate acid, but an anodic dissolution. Cells are pressed together in a plastic envelope provided with grid walls ( a so-called anodic basket) in conductive contact, in order to form an anode to which a voltage is applied (see FIG. 2). This anodic basket can be made, for example, of polypropylene, polyethylene or teflon. This particular operating technique not only increases the rate of dissolution, but also results in a combined dissolution and separation step. Consequently, the simultaneous application of an acid and electric current results in a synergistic effect, that is to say, simultaneous dissolution and separation of the components of the cells into sub-groups. By means of this anodic dissolution, the organic material which is included in button cells (plastic membranes, rings, rubber, paper etc.) accumulates in the anodic basket and can be discarded. As a consequence, no pyrolysis, which would result in the addition of more or less carbonized material to the metal oxides and metals, is necessary.

Furthermore, this anodic dissolution results in a first separation into cathodic products which include metals such as silver, mercury, zinc, iron, chrome, nickel, possibly copper and cadmium (if nickel/cadmium cells are included in the unsorted button cells), and anodic products which include mercury oxides, silver oxides, gold, silver, copper and manganese oxide (if $Zn/MnO_2$ button cells are included in the raw materials). The proportions of silver, mercury and copper present in the anodic chamber and the cathodic chamber depend upon the initial composition of the treated mixture, upon the applied operating parameters (temperature, duration, cell voltage etc.) of the anodic dissolution and upon the composition of the electrolyte ($HBF_4$ concentration, its salts, pH).

According to a further aspect of the present invention, the preferred acid for carrying out the process is tetrafluoroboric acid. This acid has several advantages over other commonly used inorganic acids :

some acids, such as dilute sulfuric acid, are unable to dissolve steel rapidly and to yield Fe by means of electrolysis;

other acids, such as hydrochloric acid or nitric acid, produce dangerous gases at the electrodes, such as nitrogen oxides or chlorine, upon decomposition, and cannot be regenerated easily;

Unlike other inorganic acids, $HBF_4$ dissolves nearly all metals and especially heavy and precious metals.

According to another advantage of the present invention, $HBF_4$ is regenerated upon electrolysis and can also be recovered by distillation (preferably under reduced pressure to avoid decomposition). Part of the $HBF_4$ is consumed, upon anodic dissolution, by the electrolyte, mainly KOH. The alkaline tetrafluoborates which progressively accumulate are recovered by crystallization of the dissolved salts. These can be decomposed, by heating, into fluorides and $BF_3$, from which $HBF_4$ can be regenerated by passing the gaseous $BF_3$ through an aqueous solution of HF. As a consequence, although tetrafluoroboric acid is relatively expensive, compared with other inorganic acids, the raw material cost for the electrolytic agent remains very low in the process according to the present invention due to the possibility of fully recovering and recycling said tetrafluoroboric acid.

According to another aspect of the present invention, given the dissolving power of tetrafluoroboric acid and the fact that button cells are small objects with a metallic shell, the process of the present invention, although especially aimed at recycling button cells, is also suitable for recycling and recovering the metallic components of other metallic objects containing valuable metals, such as defective electronic components with metallic outer shells, wrist watches, Hg thermometers, special alloys and the like.

According to another aspect of the present invention, claimed in dependent claims 8, 9 and 13, the separation of the metallic components of the button cells, linked to the anodic dissolution of said cells, may be improved either in a batch process or in a continuous process. In a batch process, by setting the cell voltage successively at different values, metals are deposited successively at the cathode, namely, in succession, Zn, the group [Fe+Cr+Ni], Hg, Ag, and are recovered by scraping metals from the cathode, for example by using a rolling cathode equipped with scrapers (as in DIETZEL cells). Thus, metals can be readily separated. In a continuous process where button cells are continuously fed to the anodic basket, the cathodic chamber may be equipped with several cathodes placed at different distances from the anode and subjected to different cell voltages.

According to another aspect of the present invention, the anodic slime is easily refined by means of a thermal decomposition step and a subsequent distillation of mercury. This refining process is performed by heating the anodic slime from 100° to 300° C. and finally to 500° C. Silver and mercury oxides decompose according to the reactions :

$$Ag_2O \rightarrow 2Ag + \tfrac{1}{2} O_2 \ (250° \text{ to } 300° \text{ C.})$$

$$HgO \rightarrow Hg + \tfrac{1}{2} O_2 \ (500° \text{ C.})$$

$$Hg_2O \rightarrow HgO + Hg \ (100° \text{ C.})$$

If only the three main commercially available chemical types of button cells are present in the starting material, this process step results in the recovery of pure mercury from the distillation and pure silver remaining in the oven; if manganese oxides are present in the anodic slime (when $Zn/MnO_2$ button cells are present in the starting material), the silver is easily separated from the manganese oxides by dissolution in an acid. If gold is present, the silver/gold mixture is separated by known processes or directly reused in jewelry.

According to a preferred embodiment of the present invention, the cathodic products are first rid of mercury by distilling the Hg off at 500° C. The distillation slag (in form of mixed metallic powder) is then electrolytically refined by anodic dissolution in tetrafluoroboric acid; the zinc is recovered by setting the cathodic voltage at 2 V, the group Fe, Cr and Ni is recovered by setting the cathodic voltage at 3 V and the silver remains at the anode.

Depending upon the chemical composition of the starting material and the operating parameters set by the person skilled in the art for the anodic dissolution (duration, temperature, cell voltage etc.), silver, mercury and possibly copper, in metallic form, appear both at the cathode and the anode or only at one electrode; if they appear at both, it may be economically convenient, according to another embodiment of the present invention, to mix the two distillation slags before further treatment and to refine them, electrolytically, together, or even to mix them before the Hg distillation.

Other features and advantages of the process according to the present invention will be better understood by considering the drawings and the following example.

DRAWINGS

Figure 1:
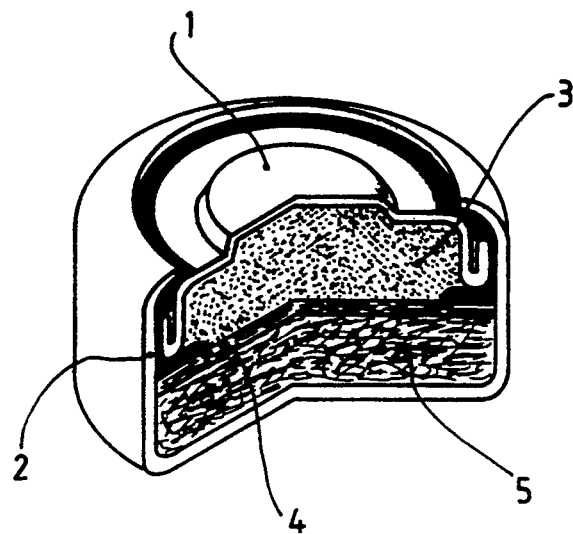
FIG. 1 represents a partial sectional view of a common button cell.
Figure 2:
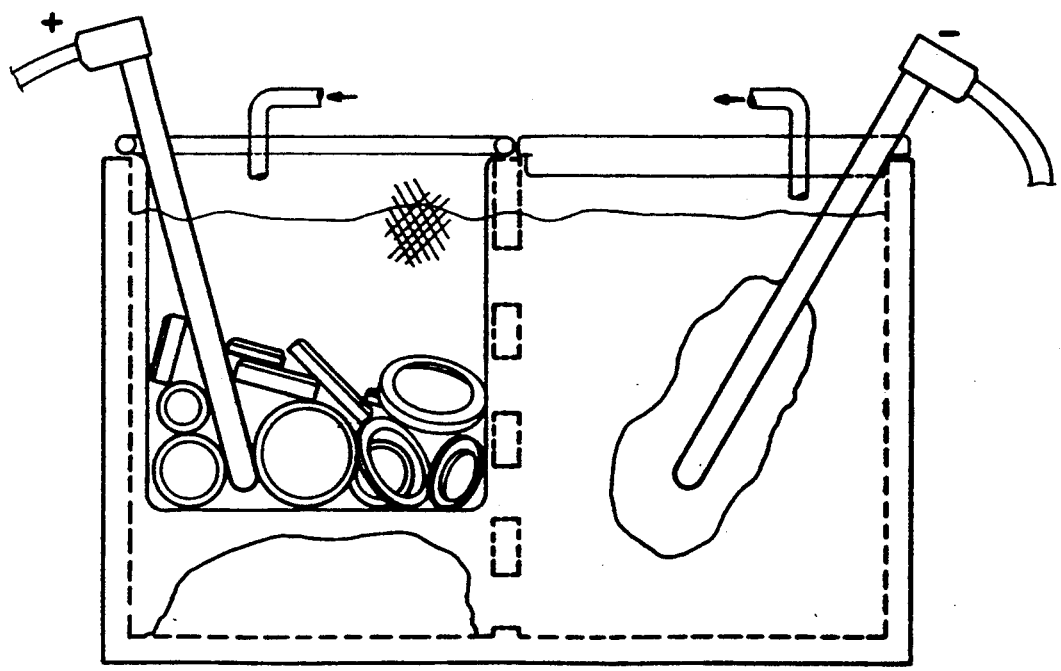
FIG. 2 shows the anodic dissolution vessel.
Figure 3:
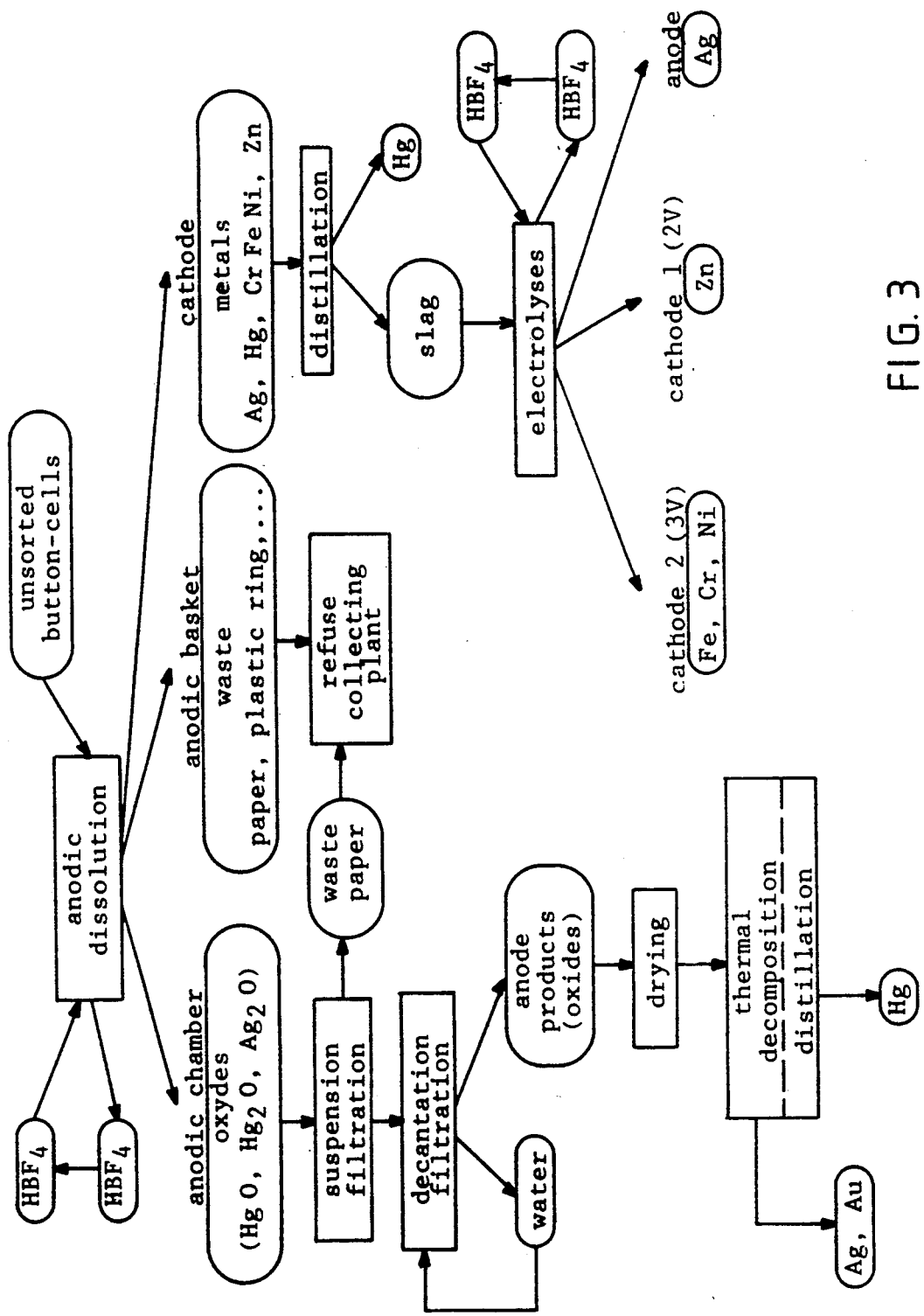
FIG. 3 is a flow diagram of the whole process.

EXAMPLE 10 kg of a mixture, obtained from a watchmakers shop, comprising $Zn/HgO$, $Zn/Ag_2O$ and $Zn/O_2$ button cells and also several defective gold-plated wrist watches and a broken mercury thermometer, are poured into a teflon basket in which a steel plate anode is suspended. The basket is dipped in a 100-liter polyethylene vessel containing about 70 liters of 20% tetrafluoroboric acid. The vessel is sealed and the cell voltage is set at 4 V. Electrolysis is performed for one and a half hours. Due to the energy released by the chemical reactions and the electric current, the temperature rises to 55° C. and remains above 40° C. After an initial increase due to the cell envelope dissolution and the reaction with the electrolyte, the pH is maintained between 2 and 4. Since hydrogen is released around the cathode, fresh air is blown into the vessel and extracted at the opposite end of the vessel in order to avoid explosive gas mixtures, filtered and purified by a wash column (not shown) and released. After the anodic dissolution, the products remaining in the anodic basket consist of plastic and rubber rings, membranes, grids, pieces of paper, graphite and some broken glass. After washing, this mixture can be discarded as ordinary waste. The anodic slime contains mainly metallic oxides (fine powder) and also some fragments of paper and graphite. This slime is suspended in water and roughly filtered to remove paper or plastic fragments, which are discarded with the anodic basket content. The filtrate is decanted and filtered, the water is fed back to the process (washing and suspending) and the remaining anodic slime is processed in the next step. The anodic slime is progressively heated up to 500° C. and this temperature is maintained for 120 minutes. Vapors are condensed over 2 successive cooling traps; mercury (purity 99%) is recovered in the first cooling trap, while aqueous condensates + dust + mercury are recovered in the second and fed to the anodic slime of the next batch. The yield of mercury is 650 g. The thermal decomposition slag is cooled and recovered and appears to consist of silver with traces of gold (about 0.01%).

The cathode products are subjected to the same distillation operating conditions. 420 g of mercury are recovered from the distillation process.

The cathodic distillation slag is dissolved, by means of electric current and a 20% by weight tetrafluoroboric acid solution also comprising $Zn(BF_4)_2$, so that the pH is about 5, in a sealed polyethylene vessel, with constant soft air flow, and with a graphite anode, the cathode being a stainless-steel plate. The cell voltage is first set at 2 V for 8 hours. 1.85 kg of metallic powder, consisting of 95-99% pure zinc, are recovered. The cell voltage is then increased to 3 V and maintained for 20 hours; 5.1 kg of metallic powder, consisting of about 90% iron, 3% nickel and 3% chrome, are recovered. In the anodic chamber, a metallic powder remains which appears to consist of silver with graphite fragments. During electrolysis, the average temperature is about 45° C.

The electrolyte is replaced by pure $HBF_4$ (at 20%) and electrolysis is started again for 2 hours. 330 g of silver (purity > 99%) are recovered at the cathode.

Although the invention has been described with reference to preferred embodiments thereof, it is intended that modifications and variations may be readily introduced without departing from the scope of the invention.

I claim:

1. A process for recycling an unsorted mixture of spent button cells and/or other metallic objects and for recovering their components, characterized by the following steps
   a. an anodic dissolution of the unsorted mixture by tetrafluoroboric acid and its salts;
   b. an electrolytic separation of the products obtained in the preceding step.

2. The process as claimed in claim 1, characterized in that electrolytes consisting of the tetrafluoroboric acid solutions are regenerated by distillation and the regenerated tetrafluoroboric acid is reused as electrolytic solvent, and in that the substances dissolved in said electrolytes are crystallized out or separated off by electrolysis in order to regenerate said electrolytes.

3. A process for recycling unsorted mixtures of metallic objects and for recovering their metallic components, comprised of separating the components of said mixture electrolytically, without use of a preliminary mechanical sorting step and without use of a preliminary pyrolysis step, by an anodic dissolution of the said mixture, said mixture itself constituting the anode, and in that said anodic dissolution is performed in an aqueous solution of tetrafluoroboric acid and its salts.

4. A process as claimed in claim 3, characterized in that said dissolution is performed at a temperature between 20° C. and 90° C.

5. A process as claimed in claim 4, characterized in that the concentration of tetrafluoroboric acid in said aqueous solution is between 0.1% and 50% by weight and the pH of said solution is adjusted to between pH=1 and pH=8.

6. A process as claimed in claim 5, characterized in that metal oxides accumulate in an anodic chamber as anode products in the form of an anodic slime.

7. A process as claimed in claim 6, characterized in that non-metallic products accumulate in the anodic chamber in an anodic basket.

8. A process as claimed in claim 7, characterized in that metals are deposited in a cathodic chamber at at least one cathode.

9. A batch process as claimed in claim 8, characterized in that separate metals, or sub-groups of metals are deposited successively at one cathode.

10. A continuous process as claimed in claim 8, characterized in that, in the cathodic chamber, different metals or sub-groups of metals are deposited at different cathodes.

11. A process as claimed in claim 6, characterized in that the anodic slime is reduced by thermal decomposition to a mixture of volatile and non-volatile metals and non-metallic substances.

12. A process as claimed in claim 11, characterized in that mercury, contained in the reduced anodic slime and in the cathodic products, is recovered by distillation of said slime and said cathodic products.

13. A process as claimed in claim 12, characterized in that the metals contained in the distillation slags are further separated by an electrochemical process using an aqueous solution of tetrafluoroboric acid and its salts as electrolyte.

14. A process as claimed in claim 13, characterized in that distillation slag products are separated electrolytically, zinc and the group comprising iron, chrome, and nickel being deposited either successively at one cathode or simultaneously at different cathodes, silver remaining at an anode.

15. As process as claimed in claim 14, characterized in that electrolytes consisting of the tetrafluoroboric acid solutions are regenerated by distillation and the regenerated tetrafluoroboric acid is reused as electrolytic solvent, and in that the substances dissolved in said electrolytes are crystallized out or separated off by electrolysis in order to regenerate said electrolytes.

16. The process as claimed in claim 13, characterized in that electrolytes consisting of the tetrafluoroboric acid solutions are regenerated by distillation and the regenerated tetrafluoroboric acid is reused as electrolytic solvent, and in that the substances dissolved in said electrolytes are crystallized out or separated off by electrolysis in order to regenerate said electrolytes.

17. The process as claimed in claim 5, characterized in that electrolytes consisting of the tetrafluoroboric acid solutions are regenerated by distillation and the regenerated tetrafluoroboric acid is reused as electrolytic solvent, and in that the substances dissolved in electrolytes are crystallized out or separated off by electrolysis in order to regenerate said electrolytes.

18. The process of claim 3 wherein the unsorted mixture consists of button cells.

19. The process of claim 18 wherein the unsorted mixture is comprised of button cells and metallic objects.

* * * * *